Oct. 8, 1968  W. E. CHOPE  3,405,267
INNER LAYER DISPLACEMENT MEASURING METHOD AND APPARATUS
Filed June 17, 1964
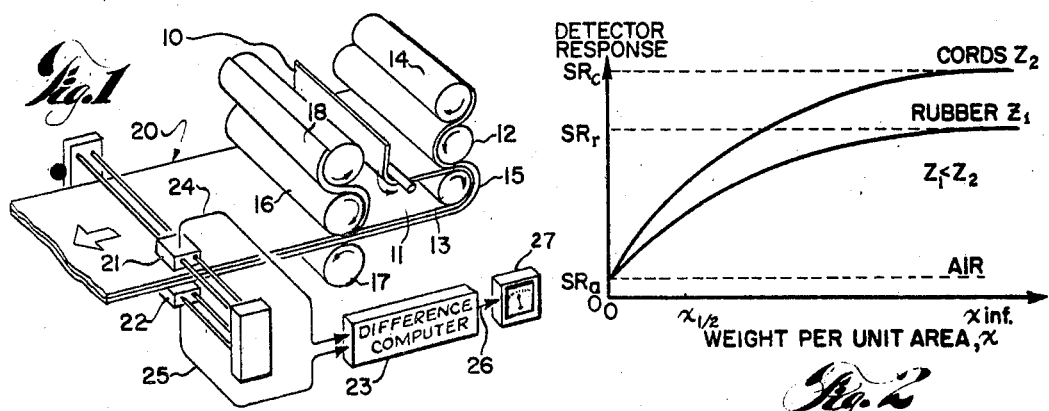
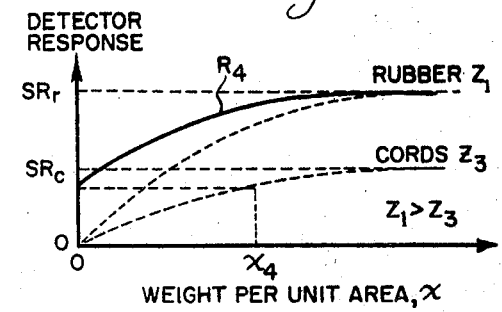
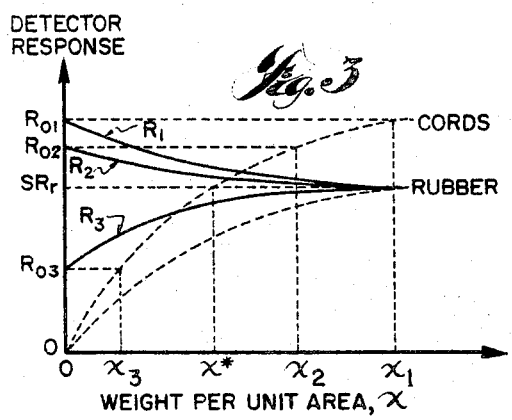
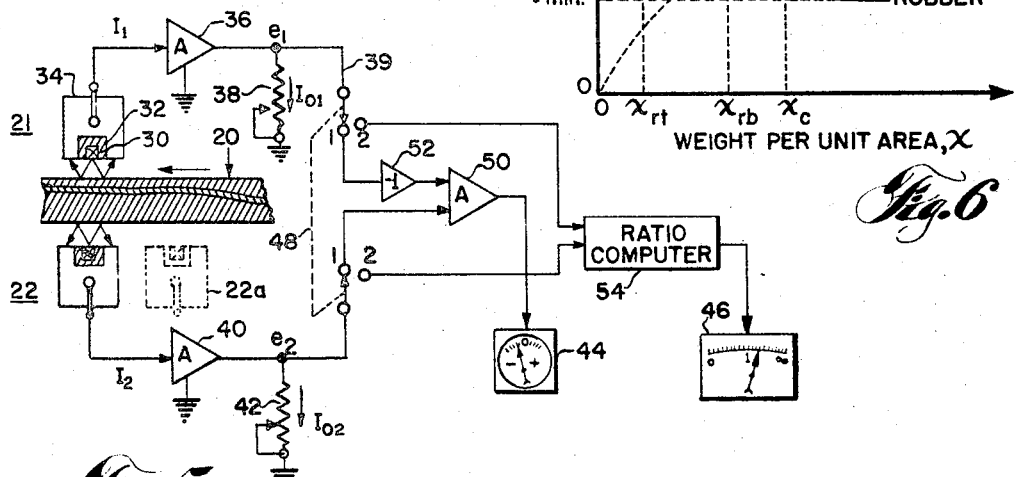
INVENTOR
WILBERT E. CHOPE
BY James J. O'Reilly
AGENT

United States Patent Office 3,405,267
Patented Oct. 8, 1968

3,405,267
INNER LAYER DISPLACEMENT MEASURING
METHOD AND APPARATUS
Wilbert E. Chope, Columbus, Ohio, assignor to Industrial
Nucleonics Corporation, a corporation of Ohio
Continuation-in-part of application Ser. No. 24,105,
Apr. 22, 1960. This application June 17, 1964, Ser.
No. 375,794
17 Claims. (Cl. 250—83.3)

This is a continuation-in-part of my copending application (now abandoned) Ser. No. 24,105 filed Apr. 22, 1960, and entitled "Radiation Thickness Gauging Technique for Measuring the Symmetry of Overlayers."

This invention relates generally to coating thickness gauges and more particularly to radiation gauging method and means for determining the relative position of an inner layer of one material in between outer layers of a different material.

In the manufacture of many products in sheet form, it is desirable to apply a coating of one substance on another to achieve improved properties in the combined materials which were not available in either material alone. One example is the manufacture of vehicle tires in which the carcass of the tire body is built up of rubberized plies which consist of rubber coated cord fabric. The strength of the tire carcass is contributed almost wholly by the cord material whose strands are loaded in tension. However, in order to protect the individual cords from impinging upon each other and thus undergoing abrasive wear, the fabric is encased in a layer of rubber forced between the individual cords of the fabric in the plane of the fabric and deposited as a protective layer both above and below the plane of the fabric. These latter layers protect the cords from the abrasive action of adjacent plies of which the tire is constructed and the rubber between the cords within the individual ply protect those cords from abrasive action between cords of the same ply.

Because of the foregoing considerations of tire manufacture, it is of great importance that the rubber applied to the cord fabric of the tire ply be coated uniformly. If this condition is not achieved, a greater amount of rubber would be applied to one surface than the other. The surface with the lesser amount of rubber would expose the cords to a greater risk of abrasive wear; and the surface with the extra rubber could lead to excessive build up of heat in the tire. The build up of heat may be attributed to the relatively poor heat conductivity of the protective rubber layer to the heat generated by flexure of the cord in normal service.

Because of the importance of insuring that the tire cord lies in the center of the protective rubber, it has been past industrial practice for samples of the coated material to be cut periodically from the output of a calendering process. The machine operator then judges the balance of the coatings applied to each surface of the cord fabric and makes needed machine adjustments. In some instances the judgment is done visually and when mechanical measuring devices are employed the procedure is destructive in that the sample is cut from the production. It is subject to errors in the operator's judgment of the balance of application of the coatings and it is a very small sample of production on which to base a decision for machine adjustment.

Other industrial coating applications require either a balanced coating or a coating weight ratio of a desired value to be applied to opposed surfaces of a traveling sheet or other member.

Briefly I determine when the desired balanced coating condition prevails by measuring the weight per unit area of the top coating and the bottom coating by means of radiation back-scattered from opposite sides of the sheet and computing any differences in the respective weights. By either subtracting or forming the ratio of the respective coating weights, I provide a signal indicative of the relative deviation from the balanced condition. My method is particularly suited to beta radiation but other types of probing radiation might be used in certain industrial applications. It is well known to those skilled in the art that of the total radiation directed against an absorber a certain portion will be backscattered. The amount backscattered to a detector on the same side of the sheet will increase as the weight per unit area $x$ increases in accordance with the following equation:

$$R = SR(1 - e^{-\mu x}) \qquad (1)$$

In Equation 1, R is the detector response, $\mu$ is the reflection coefficient for the material being irradiated, and SR is the saturation response or that maximum response that results when the weight per unit area $x$ is very large.

At this point it is well to consider the relationship between the weight per unit area $x$, the density $\rho$ and the thickness $t$ of absorber. By definition, $$x = \rho t \qquad (2)$$

If the density of the absorber can be assumed to be constant, as it is in most applications, the aforesaid radiation backscatter gauge will measure the thickness of the absorber up to an "infinite" thickness value $T_{inf}$ associated with the above mentioned very large value of $x$. Since the exponential term in Equation 1 approaches zero for large values of $x$, absorber thicknesses larger than the infinite thickness $T_{inf}$ will not change the detector response R.

The concept of infinite thickness is a very important one and one on which the operability of most prior art radiation coating weight gauges critically depends. To measure the thickness of a coating on top of a base material, such as zinc on steel, it is usually necessary in prior art gauging systems that the base material be infinitely thick to the incident radiation. Otherwise, the detector will respond to changes in thickness of the base as well as the coating.

My invention is not restricted by this limitation which cannot be provided in most processes. By measuring opposite sides of the sheet I examine substantially the same region of the base material. The base can be of any thickness up to infinite and larger but it must be substantially invariant. As is the case in all backscatter coating gauge applications, the composition of the base and the coatings must be constant and different; and, if the thickness, rather than the weight per unit area balance is to be measured, the density of both materials must not change substantially. I generate a first signal proportional to the radiation backscattered from the top coating and a second signal proportional to the radiation backscattered from the bottom coating and I form the ratio of the two signals. If the signals are identical, the computed ratio value is unity. Ratios different from unity indicate there is more coating on one side or the other or, in other words, that the base is positioned closer to one surface than the other surface if the density of each coating remains constant.

Accordingly, it is a primary object of the present invention to provide a method and means for determining the relative balance of coating applied to opposite sides of a sheet.

It is another object of the present invention to provide a measuring system for determining the position of cord fabric between two surface layers of different material.

It is yet another object of the present invention to provide a cord balance measuring system that is continuous, nondestructive and more accurate than prior art systems.

It is also an object of the present invention to provide a cord balance measuring system that is simple to construct and economical to maintain in operating order.

It is still another object of the present invention to provide a cord balance measuring system that is easily adaptable to existing process lines.

These and other objects and advantages of the present invention will become more apparent upon reference to the following description when taken in conjunction with the drawings, in which:

FIG. 1 is a perspective view of a tire fabric manufacturing process measured for cord balance by backscatter gauges in accordance with the present invention;

FIG. 2 is a graph illustrating the response of a conventional backscatter detector to a single thickness of absorber;

FIG. 3 is a graph illustrating the backscatter gauge response to a coated base material for different values of base weight per unit area;

FIG. 4 is another graph similar to FIG. 3 but plotted for different relative values of atomic number of the base and coating materials;

FIG. 5 is a block diagram of the system shown in FIG. 1 illustrating in greater detail the cord balance measuring techniques of the present invention; and, FIG. 6 is a graph illustrating the different respective gauge responses of the system of FIG. 5 to an unbalanced cord fabric.

Referring to the drawing and particularly to FIG. 1, there is shown a typical two calender train for making calendered fabric for use in the manufacture of automobile tires. A strip of fabric 10 formed of cords or other suitable material is fed in the direction of the arrows around a guide roll 11 to and between a center roll 12 and a lower roll 13 of a first roll stand. Gum rubber or the like is distributed on an upper roll 14 of the stand and transferred to one side of the fabric strip 10 by the center roll 12 to form a rubber layer 15. The semi-coated sheet is trained around the lower roll 13 and fed to and between a center roll 16 and a lower roll 17 of a second roll stand where another rubber layer 18 is applied in a similar manner. The resulting coated fabric 20 emerges in the direction of the large arrow for further processing.

In accordance with the present invention the weight per unit area of rubber coating on either side of the cord fabric 10 is measured by a pair of radiation backscatter gauges 21 and 22 which are mounted in vertical alignment adjacent to opposite surfaces of the coated fabric 20. To determine cord unbalance, a difference computer 23 is coupled to the gauges 21 and 22 by means of lines 24 and 25. The gauges may be stationary or of the traversing type adapted to scan the coated fabric 20.

Each gauge includes a source of radiation directed toward the sheet 20 and a detector positioned to receive radiation reflected back. The amount of radiation reflected is proportional to the rubber weight per unit area in a manner described in detail hereinafter. A signal indicative of the weight per unit area of rubber on top of the cords is transmitted over line 24 and another signal proportional to the weight per unit area of rubber on the underside of the cord is transmitted over line 25. Difference computer 23 provides a signal on line 26 to an indicator 27 whenever the two signals are not identical in magnitude.

Referring to FIG. 2, either backscatter gauge is responsive not only to the weight per unit area $x$ of absorber in the path of radiation but also to its effective atomic number. The curves of FIG. 2 are each drawn for a different but constant effective atomic numbers, $Z_1$ of the rubber and $Z_2$ of the cords. The value $Z_1$ does not necessarily identify a discrete elemental substance from the periodic table nor does $Z_2$. These values along the abscissa of FIG. 2 are the net effective Z of the hydrocarbonaceous material of which the rubber is composed and which is normally loaded with appropriate amounts of sulphur and other additives and the net effective Z of the cellulosic-carbohydrate material of which the tire cord may be composed. Ideally, the difference in respective atomic numbers of the two materials should be as large as possible. It may be difficult for this qualification to be met in the tire ply process described herein unless either the cords or the rubber is loaded with either a high or a low Z substance. When the weight per unit area of absorber is zero there is some residual detector response $SR_a$ due to radiation backscattering off of the air in the path of the incident radiation; however, for all practical purposes this contribution to the overall response can be ignored. For cords alone under the source-detector, the response increases with the weight of the cords to a maximum saturation response $SR_c$. If rubber instead of cords is placed under the source-detector unit, a somewhat smaller saturation response $SR_r$ is noted if $Z_{rubber} < Z_{cords}$.

At a half-thickness, $x_{1/2}$ of absorber the detected response will be exactly one-half the value of the saturation response that occurs at infinite thickness, $x_{inf}$. It should be mentioned that although $x$ is in units of weight per unit area, it is proportional to thickness under the aforesaid conditions of constant density. Since the terms "weight per unit area" and "mass" are used interchangeably in the literature, I may rely upon this definition in this disclosure. The saturation response varies with atomic number Z and atomic weight A according to $$\left[SR = k\left(\frac{Z}{A}\right)^{7/4}\right]_{x \to x_{inf}} \quad (3)$$

where $k$ is a constant of proportionality depending on the strength of the incident radiation, the geometry of the detector and other physical parameters. Regardless of what Z material is being tested, a saturation response SR is reached at approximately the same value of $x_{inf}$ for a given energy range of incident radiation.

Having examined how the detector response varies when one material or the other is irradiated, it is instructive to refer to FIG. 3 which shows how the response changes when rubber is coated on top of the cord base. The response curves of FIG. 2 are shown in dotted lines in FIG. 3 to avoid confusion. In general, from Equation 1, the starting point of each curve is fixed by $$R_0 = SR_c(1 - e^{-\mu x_c}) \quad (4)$$

where $x_c$ is the cord weight per unit area and $SR_c$ is determined in accordance with Equation 3, and the response $$R = R_0 - [R_0 - SR_r](1 - e^{-\mu x_r}) \quad (5)$$

where $x_r$ is the weight per unit area of rubber placed upon an $x_c$ weight of cords.

If the cords are of a weight per unit area $x_1 = x_{inf}$, then a response curve $R_1$ results when increasing thicknesses of rubber are put on. In this case, the maximum response $R_{o1} = SR_c$ results when there is no rubber on the cords. It is in the heavier weight region $x \geq x_{inf}$ that prior art coating gauges usually operate. However, the present invention works equally well below this backer weight; e.g., at $x_2$ and $x_3$. It may be noted that the response curves $R_1$ and $R_2$ are concave up while the response curve $R_3$ is concave down. The transition occurs at a cord weight $x_c = x^*$ where the detector response is identically equal to the saturation response to rubber, $SR_r$. At this critical weight per unit area of cords the response does not change as more rubber is piled on because an infinite thickness of rubber produces the same magnitude of response as zero thickness of rubber. This anomalous situation can be shifted if a radiation source of a somewhat different energy spectrum is selected. If sensitivity is defined as the ratio of a change of detector response to a change in rubber weight per unit area, it may be observed that the sensitivity of measurement improves the further the cord weight per unit area departs from the critical value $x^*$.

It is recognized, however, that each backscatter gauge is examining a three-layer fabric and not only the cord layer and that rubber coating nearest the surface but also the undercoating may contribute to the response of each detector. However, since the intensity of each incident radiation beam is greatly reduced after passing through two thicknesses of absorber, the amount of radiation backscattered from the undercoating will be relatively small. Moreover, what little backscatter is generated would generally be substantially absorbed in the cord and surface coating in traveling back to the detector. Only when the cords are of extremely light weight per unit area is it necessary to consider the somewhat more complex three-layer response. When examining extremely light cord weights the sensitivity of the measuring system deteriorates and this situation should be avoided. Accordingly, the remaining description for simplicity is presented as though each detector "sees" radiation backscattered only from the cords and that layer of rubber immediately adjacent the detector. Referring now to FIG. 4, response curves are drawn for the condition that the atomic number $Z_1$ of the coating is greater in magnitude than the atomic number $Z_3$ of the cords. If a relatively large cord weight per unit area $x_c = x_4$ exists, then the response curve $R_4$ results. It is apparent that the aforesaid anomalous operating condition does not obtain when $Z_{coat} > Z_{base}$, since the response curves will all be concave up and there is no cord weight per unit area that yields a detector response equivalent to the rubber saturation response $SR_r$.

Referring now to FIGS. 5 and 6, the system of the present invention is shown in more detail than FIG. 1. The top coating gauge 21 includes a source of beta radiation 30 surrounded by a shield 32 and mounted in the center of a detector 34. The detector comprises an ionization chamber that generates an electrical current $I_1$ in response to radiation returned back from the coated fabric 20. An amplifier 36 drives an output current $I_{o1}$ through a potentiometer 38 to develop a potential $e_1$ on line 39.

The bottom coating gauge 22 includes a similar source-detector providing a current $I_2$ into an amplifier 40. A potential $e_2$ is developed across a potentiometer 42 by amplifier current $I_{o2}$.

There is in effect provided one measuring channel inspecting the top of the cords and another the bottom. The detector currents which are plotted in FIG. 6 can be related to the response curves of FIG. 3 by the following relationships:

$$I_1 \infty R_t = R_o - [R_o - SR_r](1 - e^{-\mu x_{rt}}) \quad (6)$$

$$I_1 \infty R_b = R_o - [R_o - SR_r](1 - e^{-\mu x_{rb}}) \quad (7)$$

Since both detectors are operating along substantially the same response curve, when $x_{rt} = x_{rb}$ the outputs of both channels will be identical. The two detector-amplifier channels should also have essentially the same overall response characteristics. In most cases, an adjustment of either potentiometer 38 or 42 should compensate for any difference in detector or amplifier response. To check for balance, a sample of tire fabric having a precisely centered cord can be inserted between the detectors. With the sample in the gap $$e_1 = e_2 \quad (8)$$

This condition exists either when the difference between the two signals is zero or their ratio is unity and can be indicated by either a deviation meter 44 or a ratio indicator 46. Either presentation may be selected at will be means of a ganged switch 48. In position #1, the switch connects $e_2$ directly into a summing amplifier 50 but passes $e_1$ through a phase-inverting unity gain amplifier 52 before summing it with $e_2$. In position #2, switch 48 connects the two potentials into a ratio computer 54 of conventional design which drives the indicator 46.

From FIG. 6 it is apparent that if there is more rubber on the bottom than the top of the tire ply, there will be a somewhat smaller current $I_2$ in the lower channel than the current $I_1$ in the upper channel. Similarly, the output potential $e_1$ will be greater than $e_2$. Meter 44 will indicate a negative value for deviation and the indicated ratio will be greater than unity.

It should be apparent that, if the detectors are vertically aligned as shown, radiation from one channel may directly pass through the fabric to the detector of the other channel. This is to be avoided because the extraneous direct radiation does not contribute any coating weight information and serves only to reduce the signal-to-noise ratio of the system. Of course, if the fabric is thick enough, substantially all the radiation incident on either side will be completely absorbed before it passes through the fabric. Alternatively, gauge 22 may be laterally displaced to the dotted line position 22a so long as both detectors are looking for all practical purposes at the same portion of the fabric. While coaxial source-detector units are illustrated, separate sources and detector assemblies may be utilized to direct and reflect radiation through any angle less than 180°.

While a preferred embodiment of the present invention has been described, numerous changes, additions, and omissions may be made thereto without detracting from the original spirit and scope or relinquishing any of the advantages attendant thereto.

What is claimed is:

1. A method of determining the position in a sheet of one material of constant composition and density of an intermediate layer of different material but of constant composition and weight per unit area, said method comprising the steps of:
    directing radiation into opposite sides of said sheet, and
    correlating the difference in backscatter radiation from opposite sides of said sheet with the position of said intermediate layer in said sheet.

2. A method of determining the position in a sheet of one material of constant composition and density of an intermediate layer of different material but of constant composition and weight per unit area, said method comprising the steps of,
    directing beta radiation into opposite sides of said sheet,
    correlating the difference in backscatter radiation from opposite sides of said sheet with the position of said intermediate layer in said sheet.

3. Apparatus for determining the position of a sheet of one material of constant composition and density of an intermediate layer of different material but of constant composition and weight per unit area, said apparatus comprising:
    means for directing a beam of radiation into opposite surfaces of said sheet toward said layer,
    means for detecting radiation returned from a first surface on one side of said sheet to generate a first signal that is a function of the thickness of said sheet material located between said surface and said layer,
    means for detecting radiation returned from a second surface on the opposite side of said sheet to generate a second signal that is a function of the thickness of said sheet material located between said opposite surface and said layer, and
    means for combining said first and second signals in accordance with a predetermined relationship to obtain an output signal that is a function of the deviation of said intermediate layer from the median plane of said opposite sheet surfaces.

4. Apparatus for determining the position in a sheet of one material of constant composition and density of an intermediate layer of different material but of constant composition and weight per unit area, said apparatus comprising:
    means for directing a beam of beta radiation into opposite surfaces of said sheet toward said layer,
    means for detecting beta radiation returned from a first surface on one side of said sheet to generate a first signal proportional to the thickness of said sheet material located between said surface and said layer,
    means for detecting beta radiation returned from a second surface on the opposite side of said sheet to generate a second signal proportion to the thickness of said sheet material located between said opposite surface and said layer, and means for measuring any differences in said signals to determine whether or not said intermediate layer is equidistant from each of said sheet surfaces.

5. Apparatus for determining the position of a layer of one material of constant composition and weight per unit area in a sheet of different material but of constant composition, said apparatus comprising:

means for directing a first beam of beta radiation into one surface of said sheet toward said layer, means for directing a second beam of beta radiation into an opposite surface of said sheet toward said layer, means for detecting beta radiation backscattered from each of said surfaces to provide a first signal proportional to the thickness of said material between said layer and one of said surfaces and a second signal proportional to the thickness of material between said layer and said opposite surface of said sheet, said layer material being less than an infinite thickness with respect to said beams of beta radiation, means for computing the ratio of one of said signals to the other to derive an output signal proportional to the deviation of said layer from the median plane of said opposite sheet surfaces, and means for registering an indication of said output signal, to identify the deviation of said layer from the median plane of said opposite sheet surfaces.

6. Apparatus for measuring the displacement of an intervening layer of one material within a sheet of a different material, comprising:

means for directing into the first and second opposed surfaces of said sheet respectively first and second beams of penetrative radiation;

means including a first detector responsive to radiation from said first beam which is reflected backwardly from said first surface for generating a first signal which is variable in accordance with the mass of said intervening layer, the composition of said layer, the composition of said sheet material, and the mass of said sheet between said first surface and said layer;

means including a second detector responsive to radiation from said second beam which is reflected backwardly from said second surface for generating a second signal which is variable in accordance with said mass and said composition of said layer, said composition of said sheet material and the mass of said sheet between said second surface and said layer;

means for balancing said signals when a sample sheet with its intervening layer displaced as desired is disposed between said first and second beam directing means and their respective detectors, to produce mutual cancellation of the effects on both said signals of said mass of said intervening layer, said composition of said layer and said composition of said sheet; and means for indicating any remaining unbalance in said signals when a sheet to be tested as to the displacement of its intervening layer is disposed between the first and second beam directing means and their respective detectors.

7. Apparatus for measuring relative to opposite surfaces of a sheet the displacement of an intervening layer of one material within said sheet which is of a different material, comprising:

first and second penetrative radiation sources for generating and directing first and second penetrative radiation beams respectively into the first and second opposed surfaces of said sheet;

means including a first detector responsive to radiation from said first beam which is reflected backwardly from said first surface for generating a first signal which is variable in accordance with the mass of said intervening layer, the composition of said layer, the composition of said sheet material, and the mass of said sheet between said first surface and said layer;

means including a second detector responsive to radiation from said second beam which is reflected backwardly from said second surface for generating a second signal which is variable in accordance with said mass and said composition of said layer, said composition of said sheet material, and the mass of said sheet between said second surface and said layer;

said first source and respective detector being displaced relative to said second source and its respective detector;

means for initially balancing said signals, when a sample sheet with its intervening layer displaced as desired is disposed between said first and second sources and their respective detectors, to produce mutual cancellation of the effects of both said signals of said mass of said intervening layer, said composition of said layer, and said composition of said sheet; and means for indicating any remaining unbalance in said signals when a sheet to be tested as to the displacement of its intervening layer is disposed between the first and second sources and their respective detector.

8. Apparatus as set forth in claim 6, wherein said directing means displaces said radiation beams to prevent the detection of radiation transmitted directly through said sheet.

9. Apparatus for measuring the displacement of an intervening layer of one material within a sheet of a different material, the weight per unit area and composition of said layer and the composition of said sheet remaining substantially constant, said apparatus comprising:

means for directing into the first and second opposed surfaces of said sheet respectively first and second beams of beta radiation, means including a first detector responsive to radiation from said first beam that is reflected backwardly from said first surface for generating a first signal which is variable in accordance with the weight per unit area of said sheet between said first surface thereof and said layer, means including a second detector responsive to radiation from said second beam that is reflected backwardly from said second surface for generating a second signal that is variable in accordance with the weight per unit area of said sheet between said second surface thereof and said layer, means for computing the ratio of said signals, means for initially balancing said signals so that said ratio is unity when a sample sheet with its intervening layer displaced as desired is disposed in the path of said first and second beam directing means, and means for indicating any difference in said ratio when a sheet to be tested is disposed in said path of said first and second beam directing means.

10. Apparatus as set forth in claim 9 in which said radiations directing means comprises:

first and second radioisotopes, said radioisotopes being selected to provide a predetermined average energy for said first and second beams of radiation whereby neither of said overlaying sheets presents more than an infinite thickness of absorber to said beams of radiation.

11. Apparatus as set forth in claim 9, wherein said directing means displaces one of said beams of radiation from the other to prevent detection of radiation transmitted directly throughout the sheet.

12. A method as set forth in claim 1 wherein said correlation step includes:

disposing relative to said radiation a sample sheet having an intermediate layer displaced as desired, and balancing the effects of the composition and the weight per unit area of said intermediate layer and the composition of said sheet upon said correlated difference.

13. A method of determining the position of a layer of cords in a sheet of rubber of different composition, said method comprising the steps of:
 directing beta radiation into opposite sides of said sheet,
 detecting beta radiation backscattered from each of said opposite sheet sides, and
 measuring the difference in said detected backscattered radiation to indicate the position of said cord layer relative to said opposite sheet sides.

14. Apparatus for measuring the position of a layer of cords in a sheet of rubber of different composition comprising:
 means for directing radiation into opposite surfaces of said sheet to backscatter radiation off of said cord layer,
 means for detecting the difference in radiation backscatter from said opposite sheet surfaces, and
 means for indicating said detected difference in backscatter radiation to determine the position of said cord layer relative to said opposite sheet surfaces.

15. Apparatus for measuring the position of a layer of cords in a sheet of rubber of different composition comprising:
 radiation source means for directing radiation into opposite surfaces of said sheet to backscatter radiation off of said cord layer.
 radiation detector means positioned adjacent to said opposite sheet surfaces to generate a first and a second signal proportional to the amount of radiation backscattered from each of said sheet surfaces, and
 means responsive to said signals to indicate the position of said cord layer relative to said opposite sheet surfaces.

16. Apparatus as set forth in claim 15 which further includes:
 means for subtracting one of said signals from the other.

17. Apparatus as set forth in claim 15 which further includes:
 means for computing the ratio of one of said signals to the other.

References Cited

UNITED STATES PATENTS

| | | | |
|---|---|---|---|
| 2,855,518 | 10/1958 | Foley et al. | 250—83.3 X |
| 2,897,371 | 7/1959 | Hasler | 250—83.3 X |
| 3,148,279 | 9/1964 | Skala | 250—83.3 |

ARCHIE R. BORCHELT, *Primary Examiner.*

UNITED STATES PATENT OFFICE
CERTIFICATE OF CORRECTION

Patent No. 3,405,267　　　　　　　　　　Dated October 8, 1968

Inventor(s) Wilbert E. Chope

It is certified that error appears in the above-identified patent and that said Letters Patent are hereby corrected as shown below:

Column 5, equation 7, "$I_1 \infty R_b = R_o$" should read -- $I_2 \propto R_b = R_o$ --;

Column 5, line 60, "be" at the second occurrence should read -- by --.

Column 8, line 57, "beam" should read -- beams --.

Signed and sealed this 15th day of December 1970.

(SEAL)
Attest:

EDWARD M. FLETCHER, JR.　　　　　　　WILLIAM E. SCHUYLER, JR
Attesting Officer　　　　　　　　　　Commissioner of Patents